US008956017B2

(12) United States Patent
Ioka et al.

(10) Patent No.: US 8,956,017 B2
(45) Date of Patent: Feb. 17, 2015

(54) LIGHTING APPARATUS

(75) Inventors: Kumiko Ioka, Chiba-ken (JP); Michinobu Inoue, Kanagawa-ken (JP); Hideo Nishiuchi, Hyogo-ken (JP); Kazuki Tateyama, Kanagawa-ken (JP); Koki Moriya, Kanagawa-ken (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/405,668

(22) Filed: Feb. 27, 2012

(65) Prior Publication Data

US 2012/0218743 A1 Aug. 30, 2012

(30) Foreign Application Priority Data

Feb. 28, 2011 (JP) ................................ 2011-042629

(51) Int. Cl.

| | |
|---|---|
| ***B60Q 3/04*** | (2006.01) |
| ***F21V 15/00*** | (2006.01) |
| ***B60Q 1/06*** | (2006.01) |
| ***F21V 29/00*** | (2006.01) |
| ***F21K 99/00*** | (2010.01) |
| ***F21V 23/02*** | (2006.01) |
| *F21Y 101/02* | (2006.01) |

(52) U.S. Cl.
CPC ........... *F21K 9/1355* (2013.01); *F21V 29/2243* (2013.01); *F21V 23/02* (2013.01); *F21Y 2101/02* (2013.01); *F21V 29/2262* (2013.01)
USPC .......................................... 362/362; 362/373

(58) Field of Classification Search
USPC ................. 362/362, 373, 800; 313/46; D26/2
See application file for complete search history.

(56) References Cited

U.S. PATENT DOCUMENTS

| | | | | |
|---|---|---|---|---|
| 6,794,801 | B2 * | 9/2004 | Yasuda et al. | 313/46 |
| D589,175 | S * | 3/2009 | Xue | D26/2 |
| D664,685 | S * | 7/2012 | Carroll et al. | D26/2 |
| 2009/0175041 | A1 * | 7/2009 | Yuen et al. | 362/294 |

(Continued)

FOREIGN PATENT DOCUMENTS

| | | | |
|---|---|---|---|
| CN | 102022656 A | | 4/2011 |
| JP | 2009059707 A | * | 3/2009 |

(Continued)

OTHER PUBLICATIONS

English machine translation of Applicant disclosed prior art: JP 2011-124182.*

(Continued)

*Primary Examiner* — Robert May
*Assistant Examiner* — Alexander Garlen
(74) *Attorney, Agent, or Firm* — Oblon, Spivak, McClelland, Maier & Neustadt, L.L.P.

(57) ABSTRACT

A lighting apparatus includes a case, a power source unit, and a light emitting unit. The case has a side portion provided around a first axis parallel to a direction from the power source unit toward the light emitting unit. The side portion has a first portion and a second portion disposed around a central axis parallel to the first axis. The first portion has a long distance to the central axis. The second portion has a short distance to the central axis. An end portion of an inner surface of the second portion is configured to have at least one selected from a portion perpendicular to the central axis and a portion has a recessed configuration with respect to the central axis when the inner surface is cut by a cross-section perpendicular to the central axis.

19 Claims, 12 Drawing Sheets

(56) References Cited

U.S. PATENT DOCUMENTS

| | | | | |
|---|---|---|---|---|
| 2010/0295436 | A1* | 11/2010 | Horng et al. | 313/46 |
| 2012/0161627 | A1* | 6/2012 | Chang et al. | 315/35 |

FOREIGN PATENT DOCUMENTS

| | | | |
|---|---|---|---|
| JP | 2010-56059 | | 3/2010 |
| JP | 2010-129414 | A | 6/2010 |
| JP | 2011-124182 | A | 6/2011 |

OTHER PUBLICATIONS

Japanese Office Action Issued Jan. 28, 2013 in Patent Application No. 2011-042629 (with English translation).

Combined Office Action and Search Report issued Jan. 23, 2014 in Chinese patent Application No. 201210046675.0 (with English translation).

Combined Chinese Office Action and Search Report issued Sep. 18, 2014, in Chinese Patent Application No. 201210046675.0 with English translation.

* cited by examiner (b)

LIGHTING APPARATUS

CROSS-REFERENCE TO RELATED APPLICATIONS

This application is based upon and claims the benefit of priority from the prior Japanese Patent Application No. 2011-042629, filed on Feb. 28, 2011; the entire contents of which are incorporated herein by reference.

FIELD

Embodiments described herein relate generally to a lighting apparatus.

BACKGROUND

A structure of an illumination apparatus having solid state light emitting devices such as LED (Light Emitting Diode), needs good heat dissipation for high performance like luminance and reliable.

DETAILED DESCRIPTION

Figure 1A:
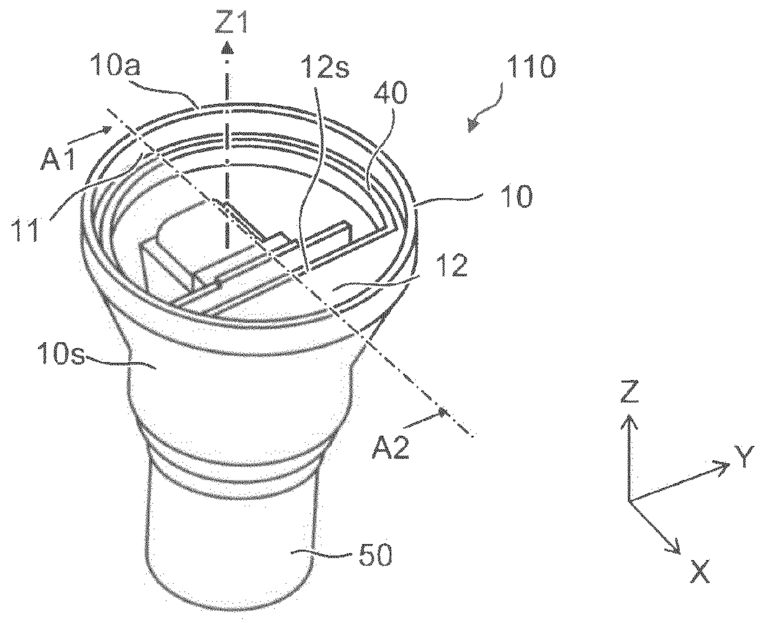
FIG. 1A and FIG. 1B are schematic perspective views illustrating the configuration of a lighting apparatus according to an embodiment.

In general, according to one embodiment, a lighting apparatus includes a case, a power source unit, and a light emitting unit. The power source unit is contained in an interior of the case. A light emitting unit is provided on the power source unit. The light emitting unit includes a light emitting device configured to emit light by a current being supplied from the power source unit. The case has a side portion provided around a first axis parallel to a direction from the power source unit toward the light emitting unit. The side portion is provided around the power source unit. The side portion has a first portion and a second portion disposed around a central axis parallel to the first axis. The central axis passes through a center of an upper end of the case when viewed along the first axis. The first portion has a long distance to the central axis. The second portion has a short distance to the central axis. An end portion of an inner surface of the second portion is configured to have at least one selected from a portion perpendicular to the central axis and a portion having a recessed configuration with respect to the central axis when the inner surface is cut by a cross-section perpendicular to the central axis, the inner surface being configured to oppose the power source unit.

Embodiments will now be described with reference to the drawings.

The drawings are schematic or conceptual; and the relationships between the thicknesses and the widths of portions, the proportions of sizes among portions, etc., are not necessarily the same as the actual values thereof. Further, the dimensions and the proportions may be illustrated differently among the drawings, even for identical portions.

In the specification and the drawings of the application, components similar to those described in regard to a drawing thereinabove are marked with like reference numerals, and a detailed description is omitted as appropriate.

Embodiment

Figure 1B:
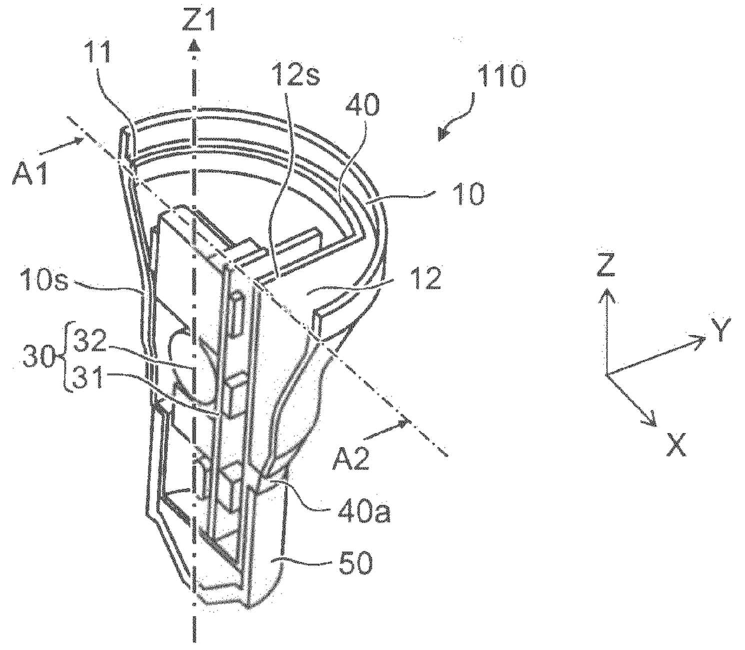

FIG. 1A and FIG. 1B are schematic perspective views illustrating the configuration of a lighting apparatus according to an embodiment.

FIG. 1B is a schematic perspective view of the lighting apparatus when cut by the A1-A2 cross section of FIG. 1A.

Figure 2A:
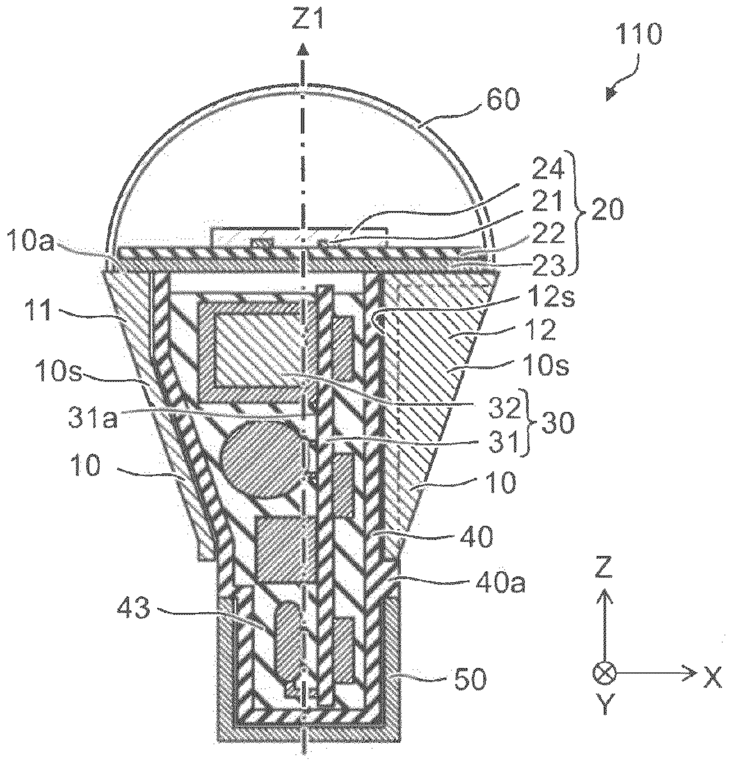
FIG. 2A and FIG. 2B are schematic views illustrating the configuration of the lighting apparatus according to the embodiment.
Figure 2B:
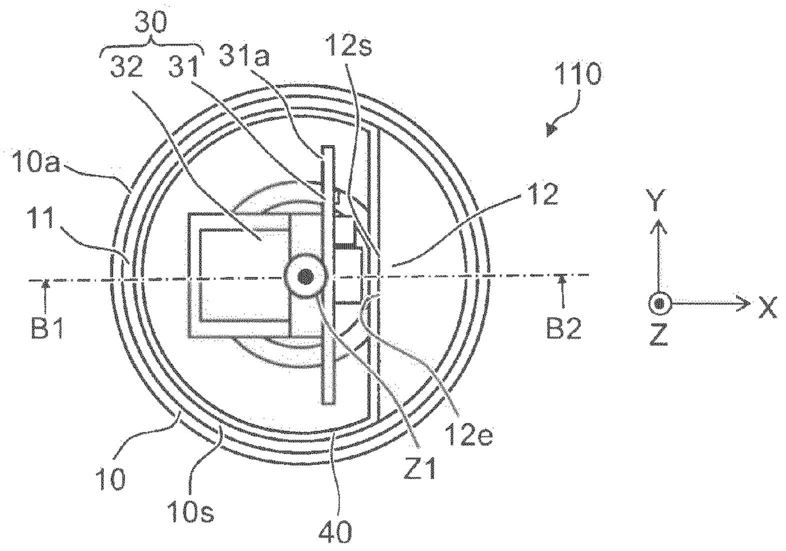

FIG. 2A and FIG. 2B are schematic views illustrating the configuration of the lighting apparatus according to the embodiment.

FIG. 2A is a cross-sectional view along line A1-A2 of FIG. 1A and is a cross-sectional view along line B1-B2 of FIG. 2B. FIG. 2B is a schematic plan view.

As illustrated in FIG. 1A, FIG. 1B, FIG. 2A, and FIG. 2B, the lighting apparatus 110 according to the embodiment includes a case 10, a power source unit 30, and a light emitting unit 20. The power source unit 30 is contained in the interior of the case 10. The light emitting unit 20 is provided on the power source unit 30. The light emitting unit 20 includes a light emitting device 21. The light emitting device 21 emits light by a current being supplied from the power source unit. The number of the light emitting devices 21 is one or multiple.

The case 10 functions to dissipate heat generated at, for example, at least one selected from the power source unit 30 and the light emitting unit 20. The case 10 includes a material having high thermal conductivity. The case 10 includes, for example, a metal. The case 10 includes, for example, aluminum, etc.

The power source unit 30 includes a power source substrate 31 and an electrical part 32. The electrical part 32 is mounted on a major surface 31*a* of the power source substrate 31. The electrical part 32 includes, for example, a part configured to control the current supplied from the power source unit 30 toward the light emitting device 21. Other than the electrical part 32, electrical parts may be mounted on the surface of the power source substrate 31 on the side opposite to the major surface 31*a*.

The light emitting unit 20 further includes, for example, a light source substrate 22, a light source heat dissipation plate 23, and a wavelength conversion layer 24. The light emitting device 21 is mounted on the light source substrate 22. Specifically, the light emitting device 21 is provided on the upper surface of the light source substrate 22. The light source heat dissipation plate 23 is provided on the lower surface (the surface on the power source unit 30 side) of the light source substrate 22. The light source heat dissipation plate 23 dissipates the heat generated at the light emitting device 21. The wavelength conversion layer 24 covers at least a portion of the light emitting device 21. The wavelength conversion layer 24 absorbs at least a portion of the light emitted from the light emitting device 21 and emits light of a wavelength different from the wavelength of the emitted light. The wavelength conversion layer 24 includes, for example, a fluorescer layer.

The light emitting device 21 includes, for example, a semiconductor light emitting device. Specifically, the light emitting device 21 includes an LED. The light emitting device 21 emits, for example, light (an emitted light) of a relatively short wavelength. The wavelength conversion layer 24 absorbs this light and converts this light into light of a long wavelength. Thereby, the light emitting unit 20 radiates, for example, white light. The white light includes various white light that is violet-tinted, bluish, greenish, yellowish, reddish, etc.

The lighting apparatus 110 is, for example, an LED electric bulb.

As illustrated in FIG. 2A, the lighting apparatus 110 further includes an insulating member 40 (an insulating case), a sealing resin 43, a base cap 50, and a globe 60.

The insulating member 40 is provided between the case 10 and the power source unit 30. The insulating member 40 electrically isolates the case 10 from the power source unit 30.

The sealing resin 43 is filled into the space between the insulating member 40 and the power source unit 30. The sealing resin 43 is, for example, a potting resin. The sealing resin 43 may include an insulative material. The sealing resin 43 may include, for example, a material having high thermal conductivity. Thereby, the heat generated at the power source unit 30 can be efficiently conducted to the case 10. The sealing resin 43 may be provided if necessary and can be omitted in some cases.

The base cap 50 is connected to a terminal included in the power source unit 30 and conducts the necessary current from the outside to the power source unit 30. The base cap 50 functions to fix the lighting apparatus 110 to another appliance.

The globe 60 covers at least a portion of the light emitting unit 20. The globe 60 can control, for example, the light distribution angle of the light radiated from the light emitting unit 20 by modifying the path of the light. At least a portion of the lower end of the globe 60 contacts an upper end 10*a* of the case 10. The lower end of the globe 60 is bonded to the upper end 10*a* of the case 10.

FIG. 1A, FIG. 1B, and FIG. 2B illustrate the state in which the light emitting unit 20 and the globe 60 are removed. The sealing resin 43 also is omitted from these drawings.

Herein, an axis parallel to the direction from the power source unit 30 toward the light emitting unit 20 is taken as a Z axis (a first axis). One axis perpendicular to the Z axis is taken as an X axis. An axis perpendicular to the Z axis and the X axis is taken as a Y axis.

The case 10 includes a side portion 10*s*. The side portion 10*s* is provided around the Z axis and around the power source unit 30.

As illustrated in FIG. 2B, an axis that is parallel to the Z axis and passes through the center of the upper end 10*a* of the case 10 when viewed along the Z axis is taken as a central axis Z1. The central axis Z1 is parallel to the Z axis and passes through the center of the upper end 10*a* when viewed along the Z axis. In this specification, the circumcircle contacting the upper end 10*a* corresponds to a circle which contacts the upper end 10*a* along the outer fringe of the upper end 10*a* when the upper end 10*a* has a shape of circle or flattened circle or polygon. When the upper end 10*a* has a polygon as viewed along the Z axis, the circumcircle passes through all the vertices of the polygon. The side portion 10*s* of the case 10 is provided around the central axis Z1.

The side portion 10*s* includes a first portion 11 and a second portion 12 that are disposed around the central axis Z1. The distance between the first portion 11 and the central axis Z1 is long. The distance between the second portion 12 and the central axis Z1 is short. In other words, the distance between the second portion 12 and the central axis Z1 is shorter than the distance between the first portion 11 and the central axis Z1.

In other words, the first portion 11 is an outer portion of the side portion 10*s*; and the second portion 12 is a portion of the side portion 10*s* protruding inward. The second portion 12 is a portion proximal to the central axis Z1. In this example, the first portion 11 opposes the second portion 12 along the X-axis direction.

For example, the first portion 11 is a thin portion of the side portion 10*s*; and the second portion 12 is a thick portion of the side portion 10*s*.

An end portion 12*e* of an inner surface 12*s* of the second portion 12 opposing the power source unit 30 when the inner surface 12*s* is cut by a cross-section (an X-Y plane) perpendicular to the central axis Z1 has at least one selected from a portion perpendicular to the central axis Z1 and a portion having a recessed configuration with respect to the central axis Z1. In this example, the end portion 12*e* of the inner surface 12*s* when cut by the cross-section (the X-Y plane) is perpendicular to the central axis Z1. In this example, the end portion 12*e* of the inner surface 12*s* recited above is parallel to, for example, the Y axis.

In this example, the end portion 12*e* of the inner surface 12*s* of the second portion 12 (the end portion when the inner surface 12*s* is cut by the X-Y plane) has a portion parallel to the major surface 31*a* of the power source substrate 31. In this example, the thickness of the second portion 12 is thicker than the thickness of the first portion 11.

Thus, the side portion 10*s* of the case 10 that has the heat dissipation function of the lighting apparatus 110 has the second portion 12 that is proximal to the central axis Z1. For example, the second portion 12 is more proximal to the power source unit 30 than is the first portion 11. Thereby, the heat generated at the power source unit 30 is efficiently conducted to the second portion 12. Thereby, a lighting apparatus having better heat dissipation can be provided.

The light emitting unit 20 is thermally coupled to at least a portion of the second portion 12 of the case 10.

Specifically, as illustrated in FIG. 2A, the light source heat dissipation plate 23 of the light emitting unit 20 contacts at least a portion of the second portion 12. Thereby, the light emitting unit 20 (e.g., the light source heat dissipation plate 23) is thermally coupled to the second portion 12. Or, the light emitting unit 20 (e.g., the light source heat dissipation plate 23) is thermally coupled to the second portion 12 via a layer having high thermal conductivity. The light emitting unit 20 also may be thermally coupled to the first portion 11.

The surface area of the portion where the second portion 12 is thermally coupled to the light emitting unit 20 is greater than the surface area of the portion where the first portion 11 is thermally coupled to the light emitting unit 20 because the second portion 12 is more proximal to the central axis Z1 than is the first portion 11. By providing the second portion 12, the surface area of the path of the heat conduction between the case 10 and the light emitting unit 20 increases. Thereby, the heat generated at the light emitting device 21 is efficiently conducted to the case 10. Thereby, the heat dissipation improves further.

Also, by providing the second portion 12, the spacing between the second portion 12 and the power source unit 30 is smaller than in the case where the second portion 12 is not provided. Therefore, for example, the space between the insulating member 40 and the power source unit 30 in the region between the second portion 12 and the power source unit 30 decreases. Thereby, the amount of the sealing resin 43 can be reduced in the case where the sealing resin 43 is provided. Therefore, the cost can be reduced. In the case where aluminum and the like are used as the case 10, the density of the sealing resin 43 is higher than the density of the case 10. As recited above, a lighter lighting apparatus 110 is possible by reducing the amount of the sealing resin 43.

FIG. 3A to FIG. 3E are schematic views illustrating the configuration of lighting apparatuses of reference examples.

Figure 3A:
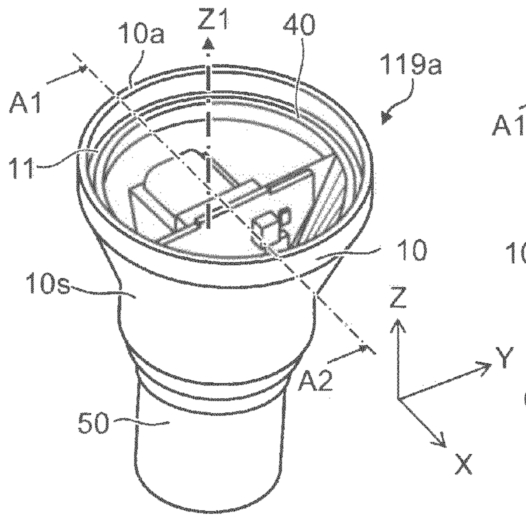
FIG. 3A to FIG. 3E are schematic views illustrating the configuration of lighting apparatuses of reference examples.
Figure 3B:
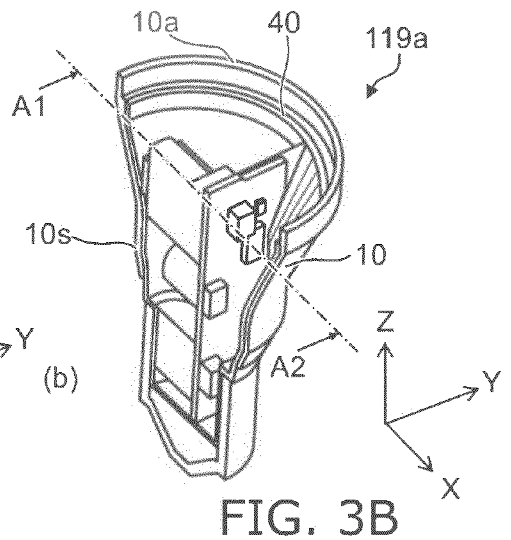
Figure 3C:
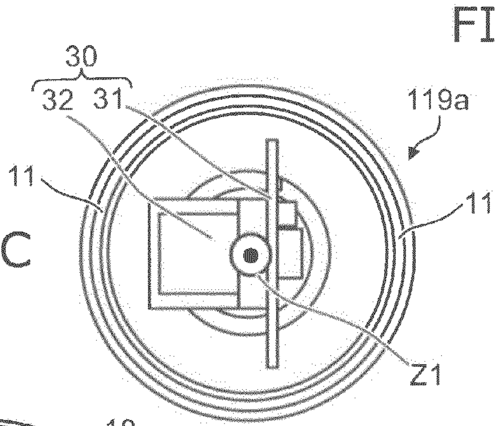

As illustrated in FIG. 3A to FIG. 3C, the second portion is not provided in the side portion 10*s* of a lighting apparatus 119*a* of a first reference example. In other words, the distance between the inner wall and the central axis Z1 is constant for the entire inner wall of the side portion 10*s*. In other words, only the first portion 11 is provided.

Therefore, the heat generated at the power source unit 30 is not easily conducted efficiently to the side portion 10*s*. Further, the surface area where the light source substrate 22 contacts the side portion 10*s* of the case 10 is small. Therefore, the heat generated at the light emitting device 21 is not easily conducted efficiently to the case 10 via the light source substrate 22. Further, the space between the side portion 10*s* and the power source unit 30 is large. Therefore, for example, the amount of the sealing resin 43 is large in the case where the sealing resin 43 is provided.

Figure 3D:
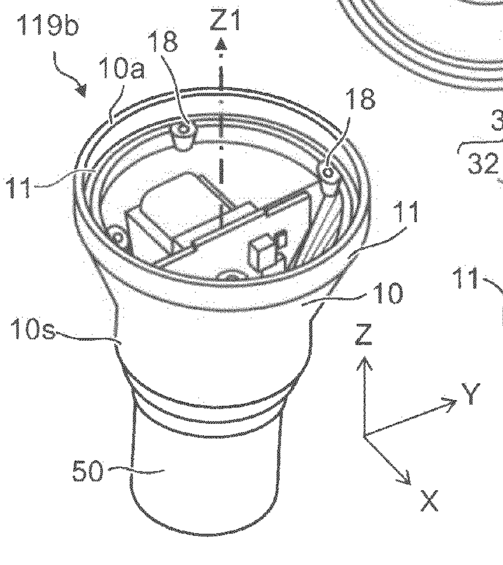
Figure 3E:
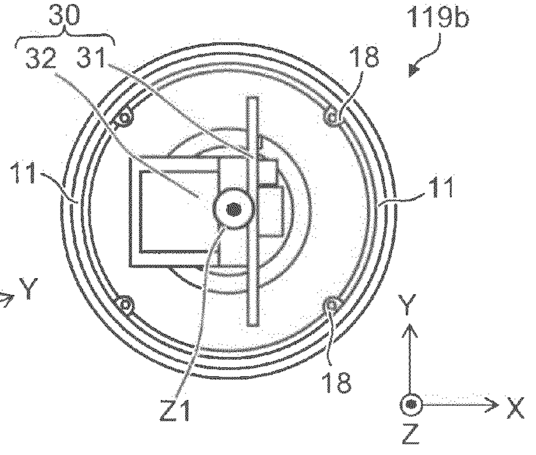

As illustrated in FIG. 3D and FIG. 3E, a screw retaining portion 18 is provided in the upper portion of the case 10 of a lighting apparatus 119*b* of a second reference example. A helical groove is provided in the screw retaining portion 18. The helical groove extends along the Z axis. The light source substrate 22 of the light emitting unit 20 is fixed to the screw retaining portion 18 by a not-illustrated screw and the like. The distance between the screw retaining portion 18 and the central axis Z1 is shorter than the distance between a portion (the first portion 11) of the side portion 10*s* and the central axis Z1. The surface of the screw retaining portion 18 opposing the power source unit 30 has a protruding configuration. In other words, in this example, the end portion of the inner surface when the screw retaining portion 18 is cut by the X-Y plane has the configuration of a portion of the circle centered on the helical groove provided in the screw retaining portion 18.

Thus, in an LED electric bulb, a structure is conceivable in which the screw retaining portion 18 is provided in a portion of the side portion 10*s* of the case 10. The screw retaining portion 18 is designed with the approach of reducing the volume of the screw retaining portion 18 as much as possible because it is sufficient for the screw retaining portion 18 to function, for example, to fix the light emitting unit 20. In other words, the screw retaining portion 18 is designed to increase the space of the interior of the case 10 as much as possible to increase the margin of the design of the power source unit 30 contained in the interior of the case 10. Therefore, as in the second reference example, the surface of the screw retaining portion 18 opposing the power source unit 30 is designed to have the protruding configuration.

In the lighting apparatus 110 according to the embodiment, the case 10 is designed with an approach that is entirely different from the approach recited above. In other words, the space of the interior of the case 10 is not large. In the embodiment, the case 10 is designed to reduce, for example, the space between the case 10 and the power source unit 30 (and the space between the insulating member 40 and the power source unit 30). In the embodiment, the end portion 12*e* of the inner surface 12*s* of the second portion 12 has, for example, the portion perpendicular to the central axis Z1. As described below, the end portion 12*e* of the inner surface 12*s* may have a portion having a recessed configuration.

As in the power source substrate 31 and the like, the power source unit 30 includes a member having a surface perpendicular to the central axis Z1. For example, at least a portion of the inner surface 12*s* of the second portion 12 is provided along this member. In the lighting apparatus 110 as illustrated in FIG. 2D, the inner surface 12*s* of the second portion 12 is provided along the major surface 31*a* of the power source substrate 31. Thereby, the second portion 12 is proximal to the power source unit 30 (the power source substrate 31).

Thereby, the heat generated at the power source unit 30 is efficiently conducted to the side portion 10*s*. Further, the light emitting unit 20 is thermally coupled to (e.g., contacts) the side portion 10*s* of the case 10 at the second portion 12 which has the large surface area. Because the coupling surface area is large, the heat generated at the light emitting device 21 is efficiently conducted to the case 10 via the light source substrate 22. For example, in the lighting apparatus 110 according to the embodiment, the temperature of the light source substrate 22 can be as much as 7° C. lower than the lighting apparatus 119*a* of the first reference example.

Also, the lighting apparatus 110 can be lighter with lower costs by reducing the space between the side portion 10*s* and the power source unit 30 and reducing the amount of the sealing resin 43.

Thus, in the embodiment, the second portion 12 is provided based on a concept that is different from conventional design concepts of the screw retaining portion 18 and the like and extensions of such conventional design concepts. Thereby, the thermal conductivity between the case 10 and at least one selected from the power source unit 30 and the light emitting unit 20 increases. Thereby, a lighting apparatus having better heat dissipation can be provided. Further, the amount of the sealing resin 43 can be reduced in the case where the sealing resin 43 is provided.

In the embodiment, a fixation portion configured to fix the light emitting unit 20 to the second portion 12 may be further provided in the second portion 12. This fixation portion includes, for example, a groove for a helix for screw retention. The fixation portion includes a protrusion, a groove, and the like configured to mesh with the light emitting unit 20. The light emitting unit 20 may be bonded to the second portion 12 (the case 10) by, for example, a bonding member having a high thermal conductivity.

In the lighting apparatus 110 of this specific example as illustrated in FIG. 1B and FIG. 2A, the insulating member 40 has a protruding portion 40*a*. The protruding portion 40*a* protrudes outward from the central axis Z1. The protruding portion 40*a* has a portion between the case 10 and the base cap 50. At least a portion of the protruding portion 40*a* opposes the lower surface of the case 10. By providing the protruding portion 40*a*, separation of the case 10 from the insulating member 40 is suppressed.

The protruding portion 40*a* functions to electrically insulate the case 10 from the base cap 50. The length along the Z axis of the protruding portion 40*a* is set to be not less than the distance necessary to electrically insulate the case 10 from the base cap 50. Thereby, the electrical insulation can be ensured.

Such a configuration is obtained by, for example, integrally forming the insulating member 40 with the case 10. Such a formation may include, for example, insert molding. The existence of air between the case 10 and the insulating member 40 is suppressed by using the insert molding. Thereby, the thermal conductivity between the case 10 and the insulating member 40 increases and the heat dissipation improves. Also, it is advantageous that assembly processes of the parts can be omitted.

However, the embodiment is not limited thereto. The methods for forming the case 10 and the insulating member 40 are arbitrary. The protruding portion 40*a* may be provided if necessary and may be omitted.

Figure 4A:
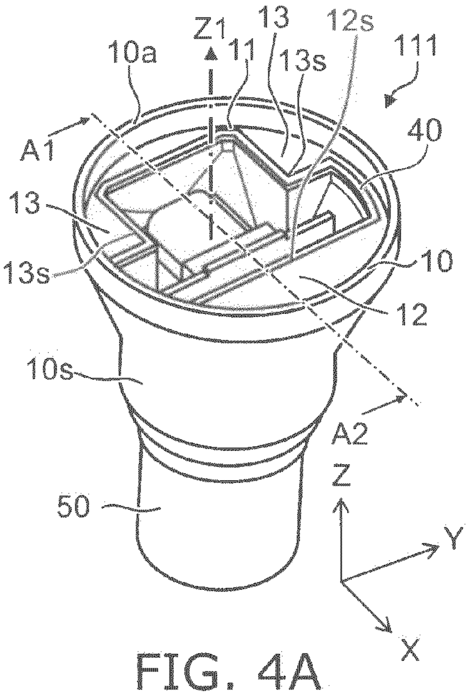
FIG. 4A to FIG. 4C are schematic views illustrating the configuration of a lighting apparatus according to the embodiment.
Figure 4B:
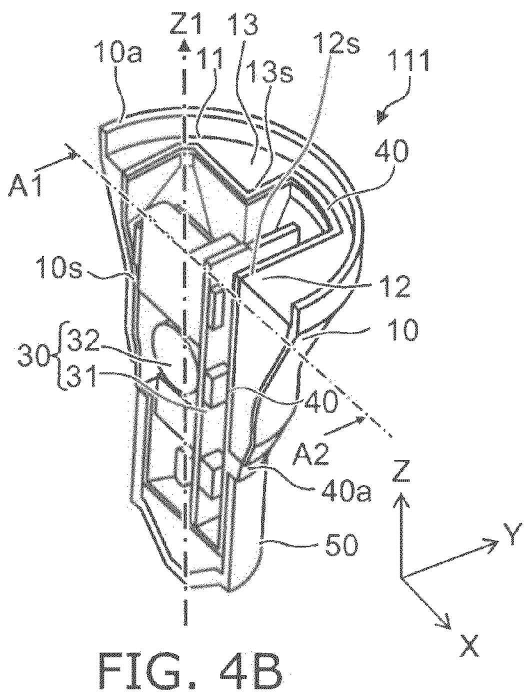
Figure 4C:
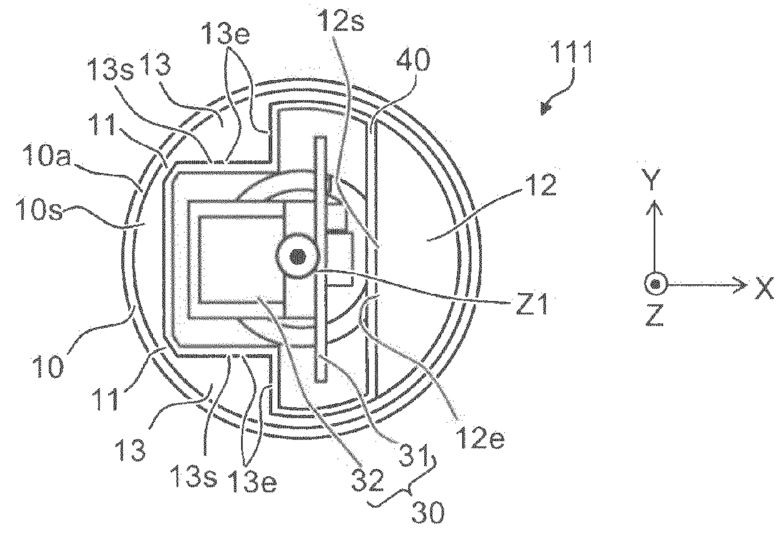

FIG. 4A to FIG. 4C are schematic views illustrating the configuration of a lighting apparatus according to the embodiment. FIG. 4A is a schematic perspective view of the lighting apparatus 111 according to the embodiment. FIG. 4B is a schematic perspective view of the lighting apparatus 111 when cut by the A1-A2 cross section of FIG. 4A. FIG. 4C is a schematic plan view. These drawings illustrate the state in which the light emitting unit 20 and the globe 60 are removed. Although the sealing resin 43 is not provided in these drawings, the sealing resin 43 may be provided.

In the lighting apparatus 111, the side portion 10*s* of the case 10 further includes a third portion 13 disposed around the central axis Z1 when viewed along the Z axis in addition to the first portion 11 and the second portion 12 recited above. The distance between the third portion 13 and the central axis Z1 is shorter than the distance between the first portion 11 and the central axis Z1. An inner surface 13*s* of the third portion 13 opposing the power source unit 30 has a protruding configuration protruding inward from the outside. The light emitting unit 20 can be thermally coupled to at least a portion of the third portion 13 of the case 10. For example, the light source heat dissipation plate 23 contacts the third portion 13.

By providing the third portion 13, a lighting apparatus having even better heat dissipation can be provided. Also, the amount of the sealing resin 43 can be reduced in the case where the sealing resin 43 is provided.

In this example, an end portion 13*e* of the inner surface 13*s* of the third portion 13 when the inner surface 13*s* is cut by a cross-section (the X-Y plane) has a portion perpendicular to the central axis Z1. A portion of the end portion 13*e* of the inner surface 13*s* is parallel to, for example, the X axis; and another portion is parallel to, for example, the Y axis. In this example, the end portion 13*e* of the inner surface 13*s* of the third portion 13 has a portion parallel to the major surface 31*a* of the power source substrate 31. The thickness of the third portion 13 is thicker than the thickness of the first portion 11.

Figure 5A:
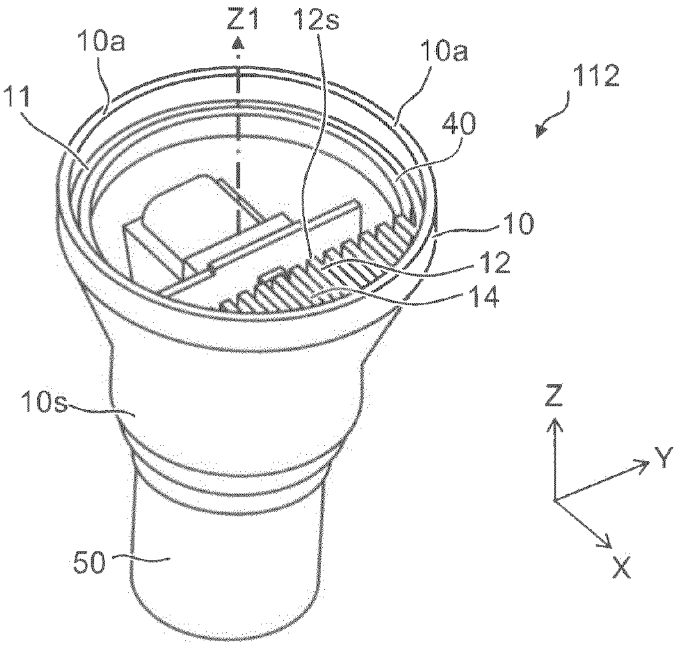
FIG. 5A and FIG. 5B are schematic views illustrating the configuration of a lighting apparatus according to the embodiment.
Figure 5B:
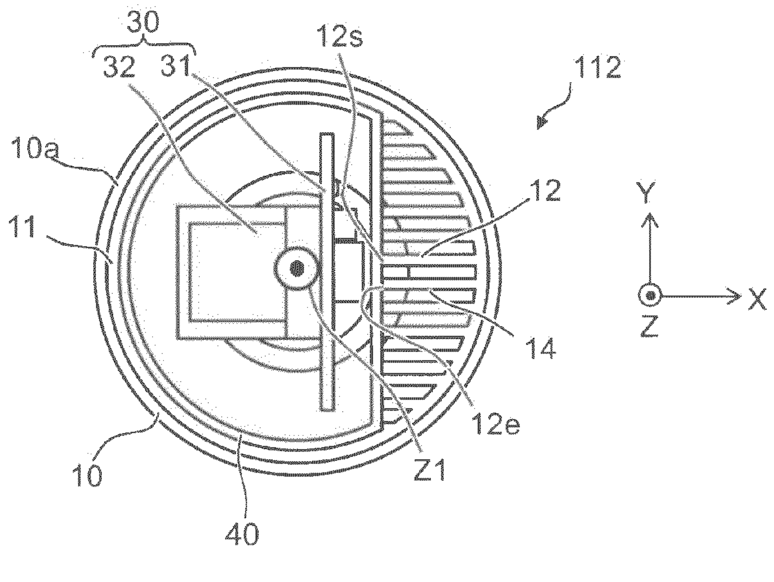

FIG. 5A and FIG. 5B are schematic views illustrating the configuration of a lighting apparatus according to the embodiment.

FIG. 5A is a schematic perspective view of the lighting apparatus 112 according to the embodiment. FIG. 5B is a schematic plan view. These drawings illustrate the state in which the light emitting unit 20 and the globe 60 are removed. Although the sealing resin 43 is not provided in these drawings, the sealing resin 43 may be provided.

In the lighting apparatus 112 as well, the side portion 10*s* of the case 10 has the second portion 12. In this example, the second portion 12 has multiple inner trenches 14. The multiple inner trenches 14 extend along the central axis Z1 (or the Z axis). At least a portion of the multiple inner trenches 14 recedes outward from the inner side of the side portion 10*s*.

By providing the multiple inner trenches 14, the heat dissipation improves further. By providing the multiple inner trenches 14, the case 10 is lighter.

In this example, the multiple inner trenches 14 have walls extending along a second axis (e.g., the X axis) perpendicular to the central axis Z1. For example, the multiple inner trenches 14 include walls parallel to the Z-X plane. The multiple inner trenches 14 are juxtaposed along the Y axis. Thereby, in the case where the multiple inner trenches 14 are provided, the manufacturing is easier. The case 10 is manufactured by, for example, die casting. In such a case, the manufacturing of the multiple inner trenches 14 of the configuration recited above is simpler and the productivity is higher than those of the case where the multiple inner trenches 14 are disposed in, for example, a radial configuration.

The multiple inner trenches 14 may not be provided in the uppermost portion of the second portion 12. In other words, the uppermost portion of the second portion 12 may be a thick portion; and the multiple inner trenches 14 may be provided lower than the thick portion in the second portion 12. Thereby, for example, the contact surface area between the thick portion of the second portion 12 and the light emitting unit 20 (e.g., the light source heat dissipation plate 23) can be large; and good heat dissipation is obtained.

FIG. 6A to FIG. 6D, FIG. 7A, and FIG. 7B are schematic views illustrating the configuration of a lighting apparatus according to the embodiment.

Figure 6A:
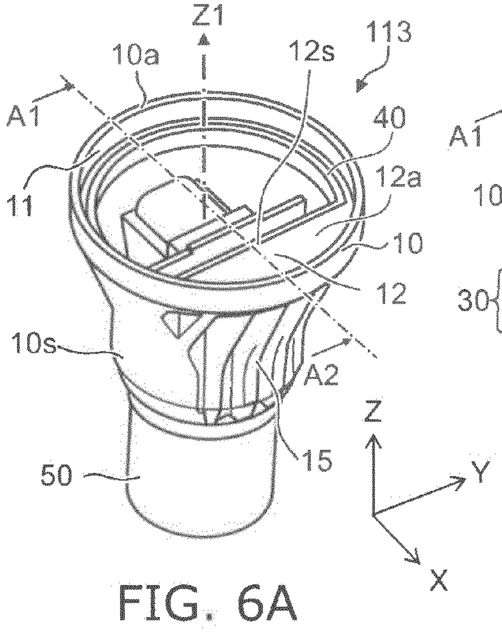
FIG. 6A to FIG. 6D, FIG. 7A, and FIG. 7B are schematic views illustrating the configuration of a lighting apparatus according to the embodiment.
Figure 6B:
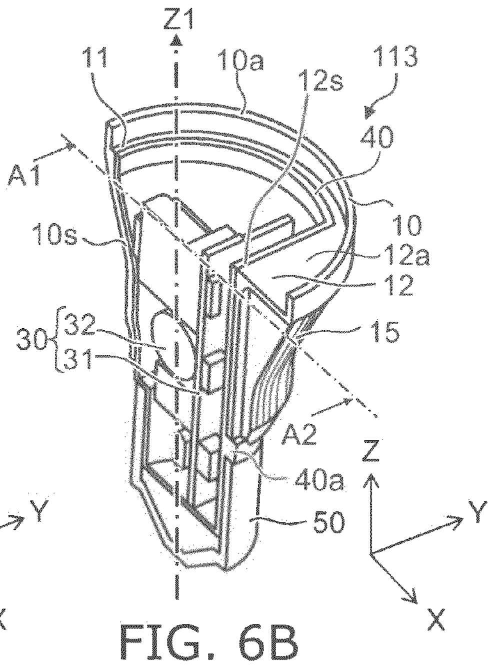
Figure 6C:
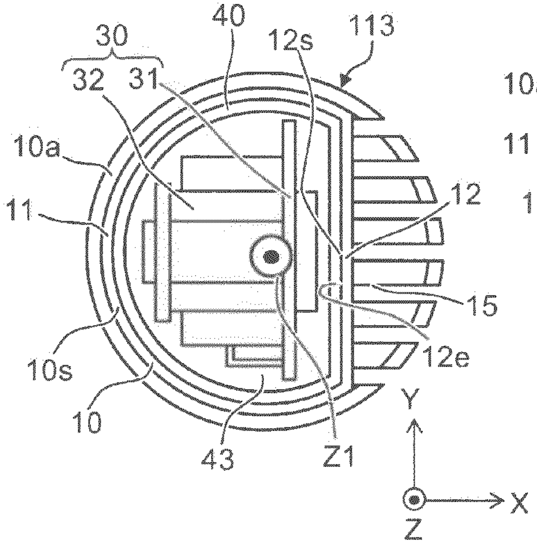
Figure 6D:
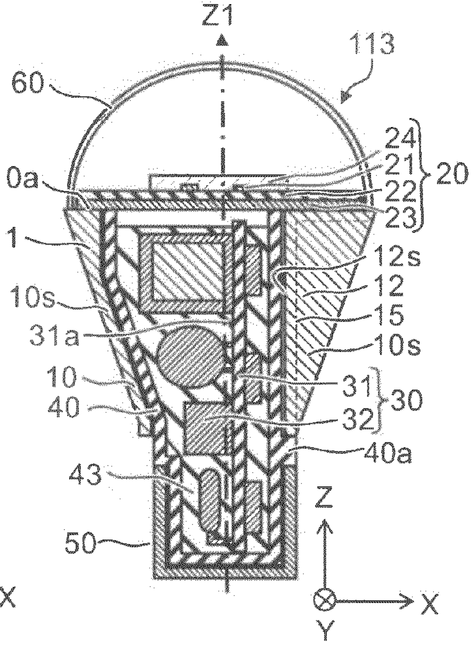
Figure 7A:
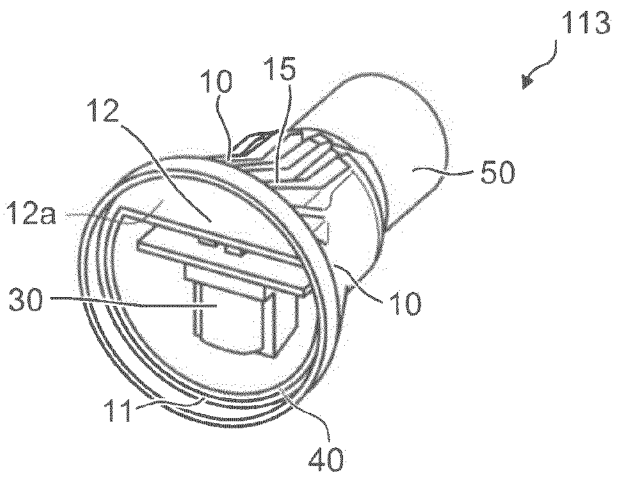
Figure 7B:
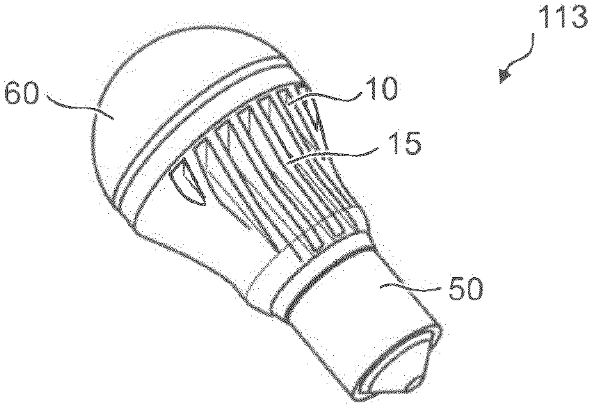

FIG. 6A and FIG. 7A are schematic perspective views of the lighting apparatus 113 according to the embodiment. FIG. 6B is a cross-sectional view along line A1-A2 of FIG. 6A. FIG. 6C is a schematic plan view. FIG. 6D is a cross-sectional view along line A1-A2 of FIG. 6A and FIG. 6B. FIG. 6A, FIG. 6B, FIG. 6C, and FIG. 7A illustrate the state in which the light emitting unit 20 and the globe 60 are removed. Also, the sealing resin 43 is omitted from FIG. 6A, FIG. 6B, and FIG. 7A. FIG. 7B is a schematic perspective view of the entire lighting apparatus 113.

In the lighting apparatus 113 as illustrated in FIG. 6A to FIG. 6D, FIG. 7A, and FIG. 7B, the side portion 10*s* of the case 10 includes multiple outer trenches 15. The multiple outer trenches 15 are provided on the outer side of the second portion 12.

The multiple outer trenches 15 function as, for example, heat dissipation fins. Thereby, the heat dissipation improves further. Also, by providing multiple inner trenches 14, the case 10 may be lighter.

In this example, at least a portion of the multiple outer trenches 15 extends along the central axis Z1. Specifically, the multiple outer trenches 15 have walls extending along the second axis (e.g., the X axis) perpendicular to the central axis Z1. Thereby, the manufacturing is easier in the case where the multiple outer trenches 15 are provided. The case 10 is manufactured by, for example, die casting. In such a case, the manufacturing of the multiple outer trenches 15 of the configuration recited above is simple and the productivity is high.

The second portion 12 has a planar portion 12*a* that extends in a plane perpendicular to the central axis Z1 to oppose the light emitting unit 20 between the light emitting unit 20 and the multiple outer trenches 15, i.e., at the uppermost portion that is thermally coupled to the light emitting unit 20. The multiple outer trenches 15 are provided on the lower side of the planar portion 12*a* and are not provided in the uppermost portion. Thereby, the contact surface area between the planar portion 12*a* and the light emitting unit 20 (e.g., the light source heat dissipation plate 23) can be large; and good heat dissipation is obtained.

The inner trench 14 and the outer trench 15 recited above may be provided in the third portion 13.

Figure 8A:
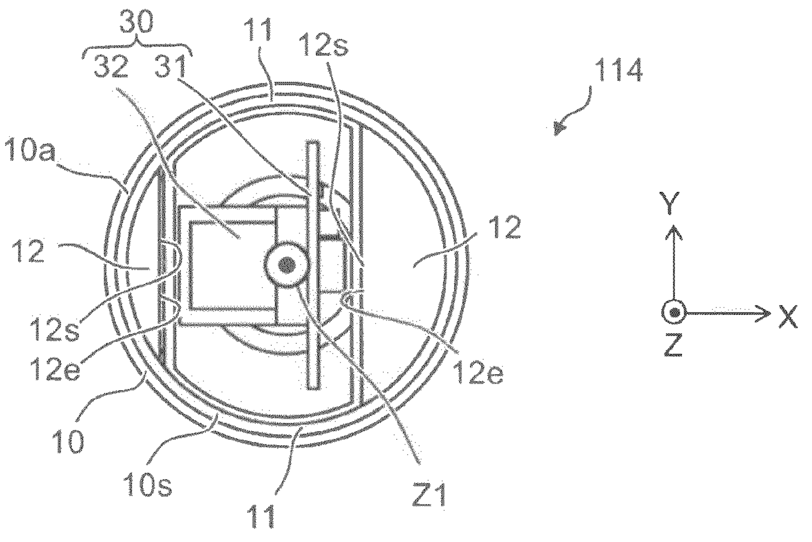
FIG. 8A and FIG. 8B are schematic plan views illustrating the configuration of lighting apparatuses according to the embodiment.
Figure 8B:
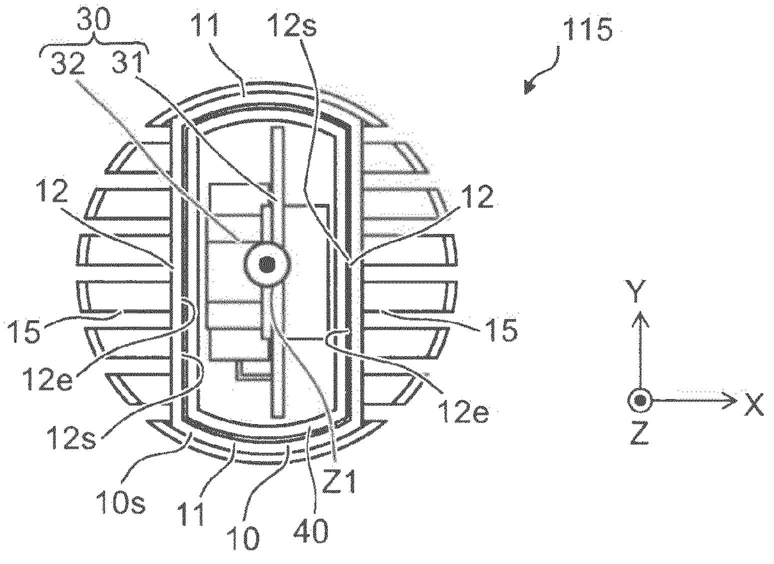

FIG. 8A and FIG. 8B are schematic plan views illustrating the configuration of lighting apparatuses according to the embodiment.

As illustrated in FIG. 8A, two second portions 12 are provided in the side portion 10*s* of a lighting apparatus 114 according to the embodiment. Two first portions 11 also are provided. Thus, the number of the second portions 12 and the number of the first portions 11 are arbitrary. A higher number of the second portions 12 further improves the heat dissipation. Also, the effect of reducing the amount of the sealing resin 43 is large.

In a lighting apparatus 115 according to the embodiment as illustrated in FIG. 8B, two second portions 12 are provided. The central axis Z1 is disposed between one of the two second portions 12 and the other of the two second portions 12. Each of the two second portions 12 have multiple outer trenches 15. Thereby, the heat dissipation improves further.

Figure 9A:
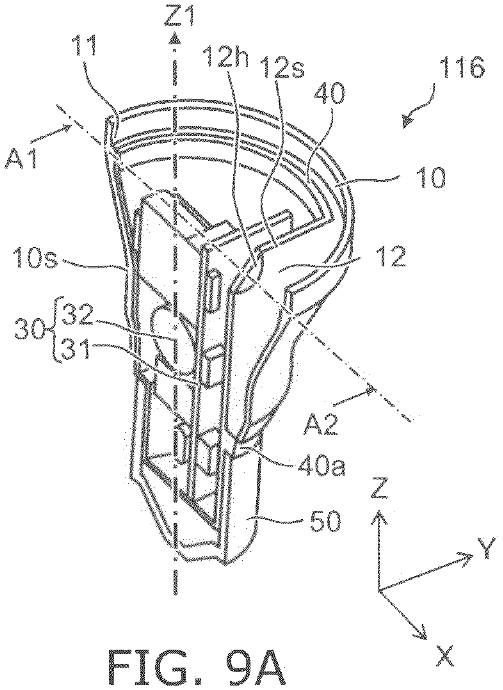
FIG. 9A to FIG. 9C are schematic views illustrating the configuration of a lighting apparatus according to the embodiment.
Figure 9B:
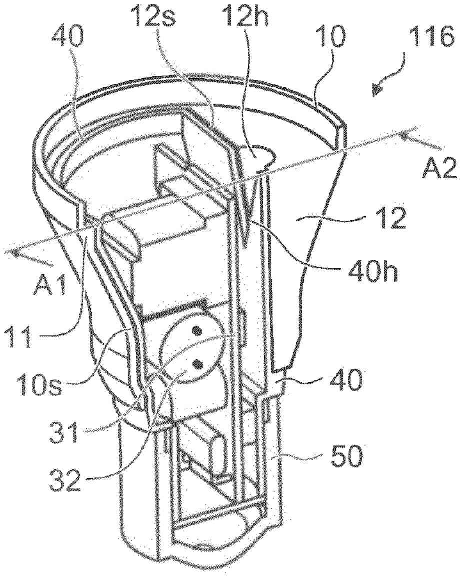
Figure 9C:
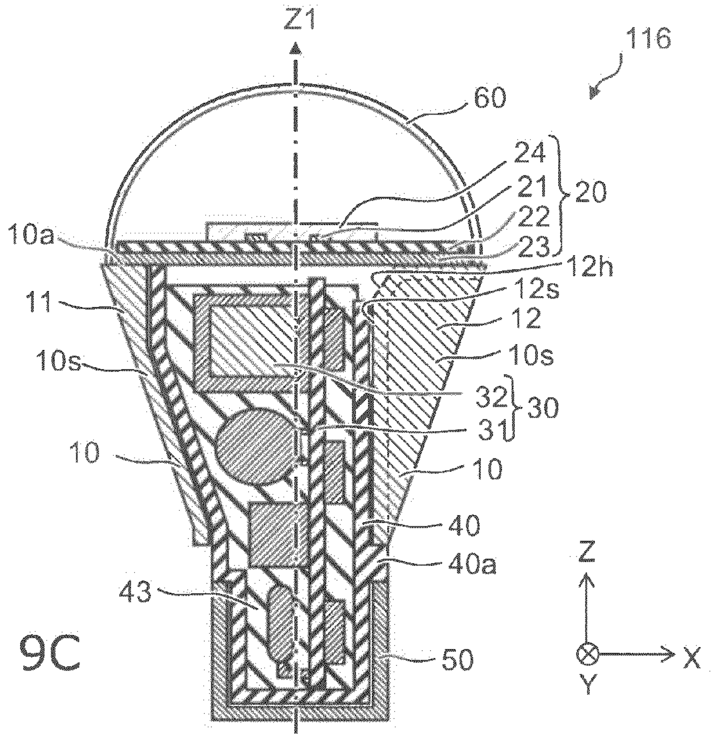

FIG. 9A to FIG. 9C are schematic views illustrating the configuration of a lighting apparatus according to the embodiment.

FIG. 9A and FIG. 9B are schematic perspective views of the lighting apparatus 116 according to the embodiment when cut along the central axis Z1. These drawings are perspective views as viewed from different directions. FIG. 9C is a cross-sectional view along line A1-A2 of FIG. 9A and FIG. 9B.

In the lighting apparatus 116 according to the embodiment as illustrated in FIG. 9A to FIG. 9C, a portion (a case notch 12*h*) is provided in a recessed configuration in the uppermost portion of the inner surface 12*s* of the second portion 12 of the side portion 10*s* of the case 10. The case notch 12*h* is a portion that recedes outward from the inside while receding downward from above.

A recess (an insulating member notch 40*h*) is provided in the insulating member 40 to match the configuration of the case notch 12*h*. The insulating member notch 40*h* is a portion that recedes downward. The insulating member notch 40*h* communicates with the case notch 12*h*. The insulating member notch 40*h* is provided, for example, to be juxtaposed with the position where the case notch 12*h* is provided in the X-Y plane. Thereby, the insulating member notch 40*h* communicates with the case notch 12*h*.

For example, the configurations of the case notch 12*h* and the insulating member notch 40*h* open upward from below when viewed along the direction outward from inside the case 10. The insulating unit notch 40*h* has a configuration corresponding to the width and the depth of the case notch 12*h*. The outline of the insulating unit notch 40*h* is formed to match the outline of the case notch 12*h*.

The case notch 12*h* and the insulating member notch 40*h* are used as a gap to insert the tip of a nozzle to dispense the sealing resin 43 when filling the sealing resin 43 between, for example, the case 10 and the power source unit 30 (specifically, between the insulating member 40 and the power source unit 30). By the case notch 12*h* and the insulating member notch 40*h* having the configurations that open upward from below, the tip of the nozzle can be easily inserted into this portion.

Thus, the productivity of the process of filling the sealing resin 43 improves by providing the case notch 12*h* of the inner surface 12*s* of the second portion 12 at the uppermost portion of the inner surface 12*s* and by providing the insulating member notch 40*h* in the insulating member 40.

Figure 10A:
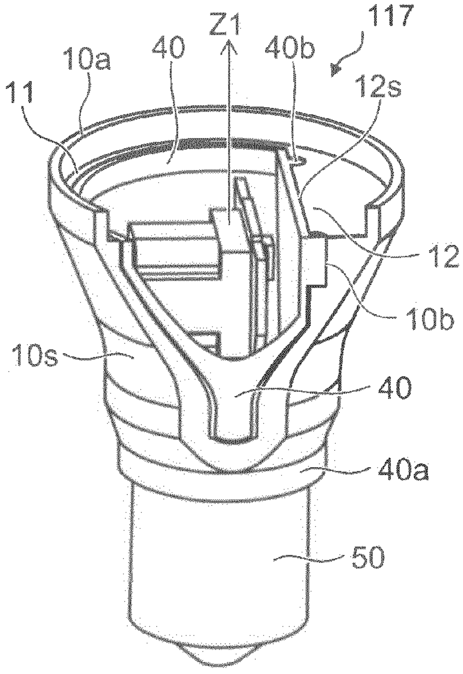
FIG. 10A to FIG. 10C are schematic views illustrating the configuration of a lighting apparatus according to the embodiment.
Figure 10B:
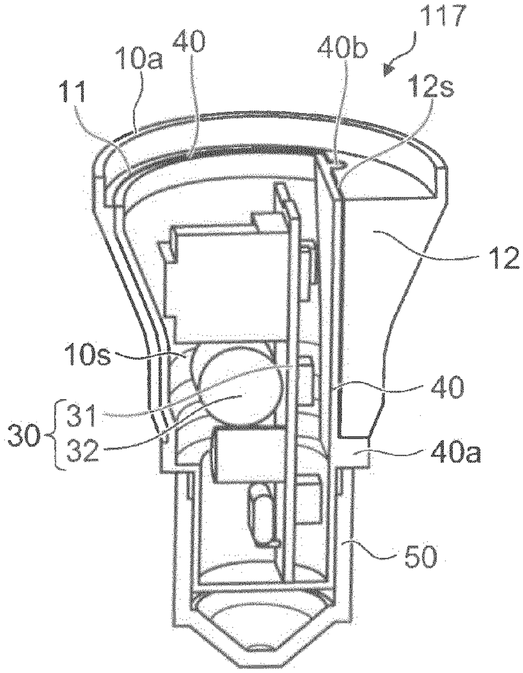
Figure 10C:
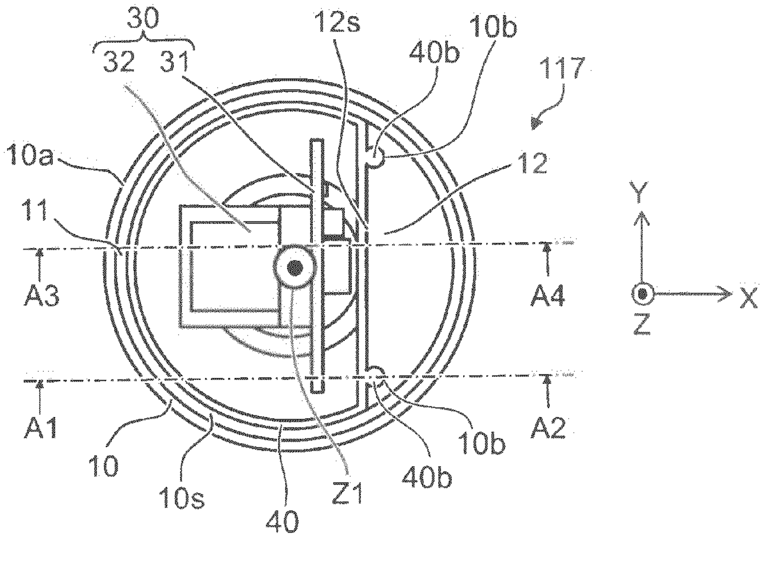

FIG. 10A to FIG. 10C are schematic views illustrating the configuration of a lighting apparatus according to the embodiment.

FIG. 10C is a plan view; FIG. 10A is a cross-sectional view along line A1-A2 of FIG. 10C; and FIG. 10B is a cross-sectional view along line A3-A4 of FIG. 10C.

As illustrated in FIG. 10A to FIG. 10C, a protruding portion 40*b* is provided in the insulating member 40 of the lighting apparatus 117 according to the embodiment. The inner surface 12*s* of the second portion 12 of the case 10 has a recess 10*b*. The protruding portion 40*b* is a portion filled into the recess 10*b*.

In this example, the recess 10*b* is a trench extending along the Z axis. The protruding portion 40*b* of the insulating member 40 is filled into this trench. The protruding portion 40*b* functions as an anchor. Thereby, the contact surface area between the case 10 and the insulating member 40 increases; and, for example, the thermal conductivity improves.

When performing the insert molding of the insulating member 40 with the case 10, there are cases where the resin of the insulating member 40 may contract and deform when curing; and thereby, the adhesion between the case 10 and the insulating member 40 may be poor. Conversely, as in this example, the adhesion between the case 10 and the insulating member 40 improves by providing the trench (the recess 10*b*) in the case 10 and by filling the protruding portion 40*b*, which is used to form the anchor, into this trench. The poor adhesion recited above can be suppressed also by the protruding portion 40*a* described in regard to FIG. 1B and FIG. 2A.

Figure 11A:
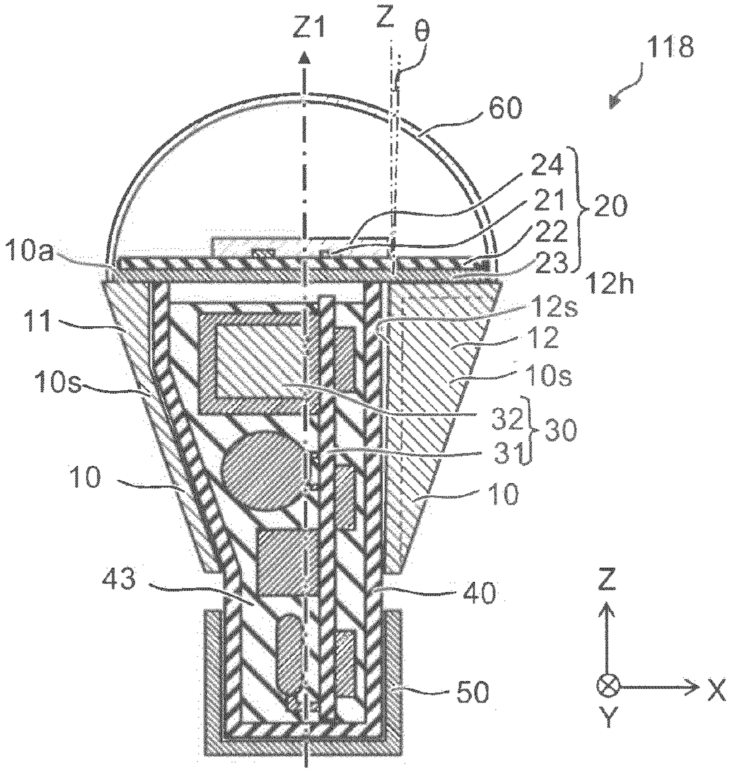
FIG. 11A and FIG. 11B are schematic views illustrating the configuration of a lighting apparatus according to the embodiment.
Figure 11B:
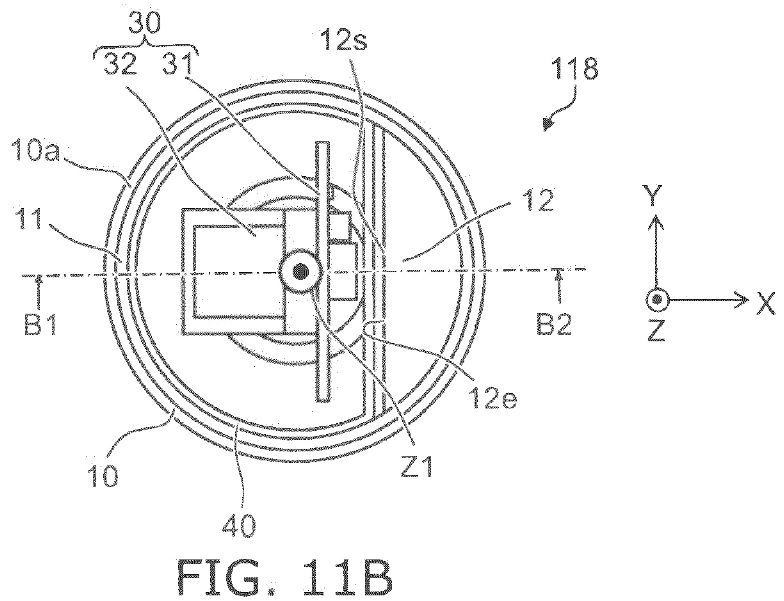

FIG. 11A and FIG. 11B are schematic views illustrating the configuration of a lighting apparatus according to the embodiment.

FIG. 11A is a schematic perspective view of the lighting apparatus 118 according to the embodiment when cut along the central axis Z1. FIG. 11B is a schematic plan view.

In the lighting apparatus 118 according to the embodiment as illustrated in FIG. 11A and FIG. 11B, the inner surface 12*s* of the second portion 12 of the side portion 10*s* of the case 10 is tilted at a small angle θ with respect to the central axis Z1 (the Z axis). In such a case as well, the heat dissipation can be improved.

By the inner surface 12*s* being tilted with respect to the central axis Z1, for example, the case 10 is easier to manufacture (e.g., when manufacturing the case 10 by die casting).

In such a case as well, the end portion 12*e* of the inner surface 12*s* has a portion perpendicular to the central axis Z1 (e.g., a portion along the Y axis). Also, the end portion 12*e* of the inner surface 12*s* when the inner surface 12*s* is cut by the X-Y plane has a portion parallel to the major surface 31*a* of the power source substrate 31 (a portion along the Y axis).

Figure 12:
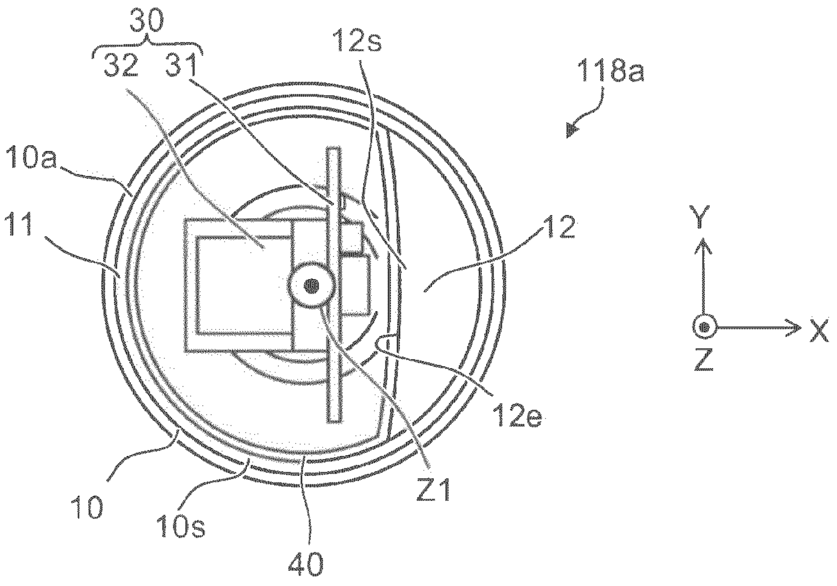
FIG. 12 is a schematic plan view illustrating the configuration of a lighting apparatus according to the embodiment.

FIG. 12 is a schematic plan view illustrating the configuration of a lighting apparatus according to the embodiment.

In the lighting apparatus 118*a* according to the embodiment as illustrated in FIG. 12, the inner surface 12*s* of the second portion 12 of the side portion 10*s* of the case 10 has a recessed configuration. The inner surface 12*s* has a recessed configuration configured to recede outward from inside to curve into a cylindrical configuration. The end portion 12*e* of the inner surface 12*s* when cut by the X-Y plane has a recessed configuration.

In such a case as well, the second portion 12 is more proximal to the power source unit 30 than is the first portion 11. The surface area of the thermal coupling of the case 10 with the light emitting unit 20 increases at the second portion 12. Thereby, the heat dissipation can be improved. Also, the amount of the sealing resin 43 can be reduced when providing the sealing resin 43.

According to the embodiment, a lighting apparatus having better heat dissipation is provided.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in lighting apparatuses such as cases, side portions, light emitting units, light emitting devices, light source substrates, light source heat dissipation plates, wavelength conversion layers, power source units, power source substrates, electrical parts, insulating members, sealing resins, base caps, globes, etc., from known art; and such practice is included in the scope of the invention to the extent that similar effects are obtained.

Moreover, all lighting apparatuses practicable by an appropriate design modification by one skilled in the art based on the lighting apparatuses described above as embodiments of the invention also are within the scope of the invention to the extent that the spirit of the invention is included.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A lighting apparatus, comprising:

a metal case;

a power source unit contained in an interior of the case; and a light emitting unit provided on the power source unit, the light emitting unit including a light emitting device configured to emit light by a current being supplied from the power source unit, the case having a side portion, the side portion being provided around a first axis parallel to a direction from the power source unit toward the light emitting unit, the side portion being provided around the power source unit, the side portion having a first portion and a second portion disposed around a central axis parallel to the first axis, the central axis passing through a center of an upper end of the case when viewed along the first axis, the first portion having a long distance to the central axis, the second portion having a short distance to the central axis, the long distance being greater than the short distance, the second portion being in physical contact with the light emitting unit, an end portion of an inner surface of the second portion being configured to have at least one selected from a portion perpendicular to the central axis and a portion having a recessed configuration with respect to the central axis when the inner surface is cut by a cross-section perpendicular to the central axis, the inner surface being configured to oppose the power source unit, wherein the power source unit includes a power source substrate and an electrical part mounted on a major surface of the power source substrate, and the end portion of the inner surface is planar and runs parallel to the major surface of the power source substrate.

2. The apparatus according to claim 1, wherein the light emitting unit is thermally coupled to at least a portion of the second portion.

3. The apparatus according to claim 1, wherein a thickness of the second portion is thicker than a thickness of the first portion.

4. The apparatus according to claim 1, wherein the second portion has a plurality of inner trenches extending along the central axis.

5. The apparatus according to claim 4, wherein each of the plurality of inner trenches has a wall extending along a second axis perpendicular to the central axis.

6. The apparatus according to claim 1, wherein the side portion has a plurality of outer trenches provided on an outer side of the second portion.

7. The apparatus according to claim 6, wherein at least a portion of the plurality of outer trenches extends along the central axis.

8. The apparatus according to claim 6, wherein the second portion further has a planar portion provided between the light emitting unit and the plurality of outer trenches to oppose the light emitting unit and extend in a plane perpendicular to the central axis.

9. The apparatus according to claim 1, wherein:

the side portion further has a third portion disposed around the central axis when viewed along the first axis;

a distance between the third portion and the central axis is shorter than the distance between the first portion and the central axis; and an inner surface of the third portion opposing the power source unit has a protruding configuration protruding inward from the outside.

10. The apparatus according to claim 1, further comprising an insulating member provided between the case and the power source unit.

11. The apparatus according to claim 10, wherein:

the case has a case notch provided in an uppermost portion of the inner surface of the second portion; and the insulating member has an insulating member notch receding downward to communicate with the case notch.

12. The apparatus according to claim 10, wherein:

the inner surface of the second portion has a recess; and the insulating member has a portion filled into the recess.

13. The apparatus according to claim 10, wherein the insulating member includes a protruding portion having at least a portion configured to oppose a lower surface of the case.

14. The apparatus according to claim 13, further comprising a base cap connected to a terminal included in the power source unit, the base cap being configured to conduct necessary current from the outside to the power source unit, the protruding portion being provided between the case and the base cap.

15. The apparatus according to claim 10, further comprising a sealing resin filled into a space between the insulating member and the power source unit.

16. The apparatus according to claim 1, wherein the inner surface is tilted with respect to the central axis.

17. The apparatus according to claim 1, wherein the inner surface has a recessed configuration configured to curve into a cylindrical configuration.

18. The apparatus according to claim 1, wherein the side portion has a plurality of the second portions.

19. The apparatus according to claim 18, wherein the side portion has two of the second portions, and the central axis is disposed between one of the two second portions and the other of the two second portions.

* * * * *